United States Patent
Fujita

(10) Patent No.: US 7,781,107 B2
(45) Date of Patent: Aug. 24, 2010

(54) FUEL CELL SYSTEM

(75) Inventor: Nobuo Fujita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1313 days.

(21) Appl. No.: 11/223,012

(22) Filed: Sep. 12, 2005

(65) Prior Publication Data

US 2006/0063049 A1    Mar. 23, 2006

Related U.S. Application Data

(63) Continuation of application No. PCT/JP2004/003142, filed on Mar. 10, 2004.

(30) Foreign Application Priority Data

Mar. 12, 2003    (JP) ............................... 2003-066679

(51) Int. Cl.
*H01M 8/00* (2006.01)
*H01M 8/04* (2006.01)
*H01M 8/18* (2006.01)

(52) U.S. Cl. .................... 429/400; 429/22; 429/24; 429/26

(58) Field of Classification Search .............. 429/12, 429/22, 25, 26, 34, 24
See application file for complete search history.

(56) References Cited

U.S. PATENT DOCUMENTS

| | | | |
|---|---|---|---|
| 3,926,051 A * | 12/1975 | Katzman | 73/277 |
| 5,965,288 A * | 10/1999 | Okamoto | 429/26 |
| 6,238,814 B1 | 5/2001 | Horiguchi et al. | |
| 6,497,972 B1 | 12/2002 | Iwasaki | |
| 6,727,013 B2 | 4/2004 | Wheat et al. | |
| 7,354,673 B2 * | 4/2008 | Fujita et al. | 429/24 |
| 2001/0014415 A1 * | 8/2001 | Iio et al. | 429/22 |
| 2002/0146602 A1 | 10/2002 | Abe et al. | |

FOREIGN PATENT DOCUMENTS

DE    198 59 504 A1    6/1999

(Continued)

OTHER PUBLICATIONS

Office Action issued in U.S. Appl. No. 10/589,434; Mar. 1, 2010.

*Primary Examiner*—Patrick Ryan
*Assistant Examiner*—Helen O Conley
(74) *Attorney, Agent, or Firm*—Oliff & Berridge, PLC

(57) ABSTRACT

As a freezing judgment mechanism, comprised in a gas-liquid separator are electrodes and, an iron core, a magnetic absorption substance located within the water, and guides and for controlling the operation of the magnetic absorption substance. The control unit applies a voltage to the electrodes, changing the iron core to an electromagnet by the magnetic field generated between the electrodes. When not frozen, the electromagnet and the magnetic absorption substance are pulled together, the contact points A and B close, and a conductive state is achieved. When frozen, even if the electromagnet and the magnetic absorption substance are pulled together, ice exists between the two items, so it is difficult for the magnetic absorption substance to float upward. After voltage is applied to the electrodes, the control unit judges the water Wa within the gas-liquid separator to be frozen when a conductive state is not detected even after a specified time has elapsed.

8 Claims, 10 Drawing Sheets

FOREIGN PATENT DOCUMENTS

| | | |
|---|---|---|
| DE | 102 14 727 A1 | 1/2003 |
| EP | 0 823 743 B1 | 2/1998 |
| EP | 0 831 543 B1 | 3/1998 |
| JP | A-08-273689 | 10/1996 |
| JP | A 11-214025 | 8/1999 |
| JP | A-11-317235 | 11/1999 |
| JP | A-2002-093445 | 3/2002 |
| JP | A-2002-313383 | 10/2002 |
| JP | A-2002-313389 | 10/2002 |
| JP | A-2004-047210 | 2/2004 |
| JP | A-2004-146187 | 5/2004 |
| WO | WO 00/25379 A | 5/2000 |
| WO | WO 00/65676 * | 11/2000 |
| WO | WO 2004/021493 A1 | 3/2004 |

* cited by examiner

FUEL CELL SYSTEM

This is a Continuation of PCT Application No. PCT/JP2004/003142 filed Mar. 10, 2004, which claims priority from JP2003/66679, filed Mar. 12, 2003. The disclosures of both applications incorporated herein in their entirety by reference thereto.

FIELD OF TECHNOLOGY

The present invention relates to freezing judgment of a fuel cell system for generating electricity using an electrochemical reaction of hydrogen and oxygen.

BACKGROUND ART

In recent years, there has been a focus on fuel cells for generating electricity using an electrochemical reaction of hydrogen and oxygen as an energy source. Water is generated by the electrochemical reaction from fuel cells. The generated water has been used for cooling of the fuel cell system interior, and is discharged from a water discharge pipe to the outside.

When this kind of fuel cell system is stopped for a fixed time under low temperature conditions, such as when the outside air temperature is lower then the freezing point, the water collected in parts inside the system, such as a gas-liquid separator, freezes. This causes water to be discharged from the water discharge pipe to the outside impossible, which generates gas accumulation, so that the fuel cell system cannot operate, and there is the risk of shortening life of the fuel cell system.

SUMMARY

The present invention is created considering these problems, and there are needs to suppress or avoid the harmful effects that may occur with a fuel cell system by the freezing of water at the gas-liquid separator.

The fuel cell system of the present invention is provided in order to address the problems described above. The fuel cell system of the present invention is characterized by comprising a fuel cell, a gas supply pipe for supplying to the fuel cell gas used for generating electricity, a gas discharge pipe for discharging gas discharged from the fuel cell, a gas-liquid separator, located in at least one of the gas supply pipe or the gas discharge pipe, for collecting water within the gas, and a freezing judgment device that judges the freezing of water collected within the gas-liquid separator.

With the present invention, it is possible to detect freezing of water within the gas-liquid separator. Therefore, it is possible to avoid the harmful effects that occur to the gas-liquid separator during freezing. Freezing can be judged at various timings, and if performed at the time of activation of the fuel cell system, for example, when freezing of water within the gas-liquid separator is detected, it is possible to prohibit activation of the fuel cell system. Therefore, it is possible to suppress degradation of the fuel cell due to forcible operation of the fuel cell during freezing, and also to avoid the occurrence of abnormalities with the system. Also, when freezing is detected, it is possible, for example, to perform thawing by operating a heater using the power of the battery, or the like, and to activate the fuel cell system when thawing is detected.

For the fuel cell system of the present invention, the freezing judgment according to the freezing judgment device may also judge freezing of the water collected within the gas-liquid separator based on the difference in the flow characteristics of the water collected in the gas-liquid separator when frozen and when not frozen. In this case, it is easy to judge the freezing of water within the gas-liquid separator.

As the freezing judgment based on the flow characteristics, for example, it is possible to comprise a movable member that is operable within the water collected within the gas-liquid separator, an operation device for operating the movable member, and an operation detector that detects the operation state of the movable member, and to have the freezing judgment device judge the freezing of the water collected within the gas-liquid separator based on the detection results using the operation detector. By working in this way, it is possible to judge freezing relatively easily.

For example, if the movable member is metal, and the operation device is a magnet, it is also possible to detect the operating state by whether or not the metal moved such as by floating, or the like, by bringing the magnet close to the metal during freezing judgment. The operation detector may also be provided with a sensor between the movable member located at a specified position on the bottom surface and the bottom surface, and by using this sensor, to confirm the ups and downs of the movable member. It is also possible, for example, to detect whether or not there is a difference in the state of the movable member before and after the freezing judgment using the operation device.

Also, for example, it is possible to comprise a contact point that changes the conductivity state by the operation of the movable member, and for the operation detector to detect changes in the conductivity state of the contact point. For example, it is possible to judge freezing, when not frozen, by the movable member moving and contacting the contact point, the contact point that was in an unfrozen state being in a conductive state, and when frozen, because there is ice, the movable member does not move, and does not contact the contact point, so the non-conductive state remains as is. Separate from the contact point being a movable member, it can also be a switch, constituted so that when the moving member moves, the switch turns on, resulting in a conductive state. Also, for example, it is possible to judge freezing by going from a conductive state with the movable member in contact with the contact point, to being separated from the contact point by the movable member moving, resulting in a non-conductive state. This freezing judgment may also be applied as the switch constitution described above. There is no restriction to these examples, as it is acceptable as long as the conductivity state of the contact point changes with operation of the movable member, and it is possible to detect that.

With the fuel cell system of the present invention, the gas supply pipe includes a fuel gas supply pipe for supplying fuel gas to the fuel cell, the gas supply pipe includes a fuel gas supply pipe for supplying fuel gas to the fuel cell, the gas discharge pipe includes an anode off gas discharge pipe for discharging anode off gas from the fuel cell, the gas-liquid separator is located over the anode off gas discharge pipe, the fuel cell system further comprises linked bypass piping that branches from the anode off gas discharge pipe and which is continuous under the water surface within the gas-liquid separator, a switching device that switches the fuel gas path to either the anode off gas discharge pipe or the linked bypass piping, and a pressure measuring device that measures the pressure of the anode off gas discharge pipe, and the freezing judgment device may also judge freezing based on the pressure value measured by the pressure measuring device in a state with the path switched to the linked bypass piping side.

The switching device may be easily realized by using switching using valves, for example. The pressure measuring device may comprise a pressure sensor in the anode off gas discharge pipe, for example. The pressure sensor may be located on the upstream side of the gas-liquid separator or may also be located on the downstream side between the gas-liquid separator and the fuel cell stack.

When water is frozen within the gas-liquid separator, the hydrogen gas that passes through the linked bypass piping cannot pass the water surface of the gas-liquid separator, and compared to when the fuel cell system is operating normally, specifically, when it is not frozen, a change occurs in the pressure value. The pressure change has cases of being the specified value or higher and cases of being the specified value or lower depending on the site at which the pressure sensor is located. In either case, if judgment is done based on the upper limit and lower limit of the pressure value measured during normal operation of the fuel cell system, it is possible to judge freezing with a simple structure.

The hydrogen gas used for this freezing judgment may be supplied from a hydrogen tank for supplying fuel gas to the fuel cell via the fuel gas supply pipe, or it is also possible to use hydrogen gas that already existed during the previous operation of the fuel cell system.

For the fuel cell system of the present invention, the freezing judgment device may judge the freezing of water collected within the gas-liquid separator based on differences in volume of the water within the gas-liquid separator when frozen and when not frozen.

Generally, water undergoes a change of state to ice due to freezing, and it is known that the volume expands according to this change of state. As with the present invention, if freezing is judged by the difference in volume when frozen and when not frozen according to this volume expansion, it becomes possible to easily judge the freezing of a mechanical device such as the gas-liquid separator.

As this kind of freezing judgment device, if it comprises a pressure measuring device that measures pressure at a part lower than the water surface within the gas-liquid separator, and freezing is judged based on the measured pressure value, this is desirable because it is possible to judge freezing with a simple structure. In this case, for example, it is possible to easily realize this by installing a pressure measuring device such as a pressure sensor, for example, at any location under the water surface of the gas-liquid separator.

Also, for example, it is possible to comprise an elastic member that changes shape with pressure and is provided at any part under the water surface within the gas-liquid separator, and to have the freezing judgment device judge freezing based on the shape change state of the elastic member.

The present invention also provides a freezing judgment device that judges freezing for a gas-liquid separator. The freezing judgment device of the present invention is characterized by comprising gas piping inside of which gas flows, a gas-liquid separator that is connected to the gas piping for separating and collecting moisture contained within gas that flows in the gas piping, and a freezing judgment device that judges the freezing of water collected within the gas-liquid separator based on differences in the flow characteristics when the water collected within the gas-liquid separator is frozen and when it is not frozen.

The freezing judgment device of the present invention can be realized in various aspects in the same way as the fuel cell system of the present invention.

With the present invention, it is possible to use the various characteristics described above with suitable combinations or with parts omitted. The present invention is not limited to the constitution as the fuel cell system described above, but can also be constituted in various aspects such as a control device for controlling activation of judgment of freezing of the fuel cell system, a control method, a freezing judgment method, or the like. For any of the aspects, it is possible to suitably apply the various characteristics described above.

DETAILED DESCRIPTION OF EMBODIMENTS

Figure 1:
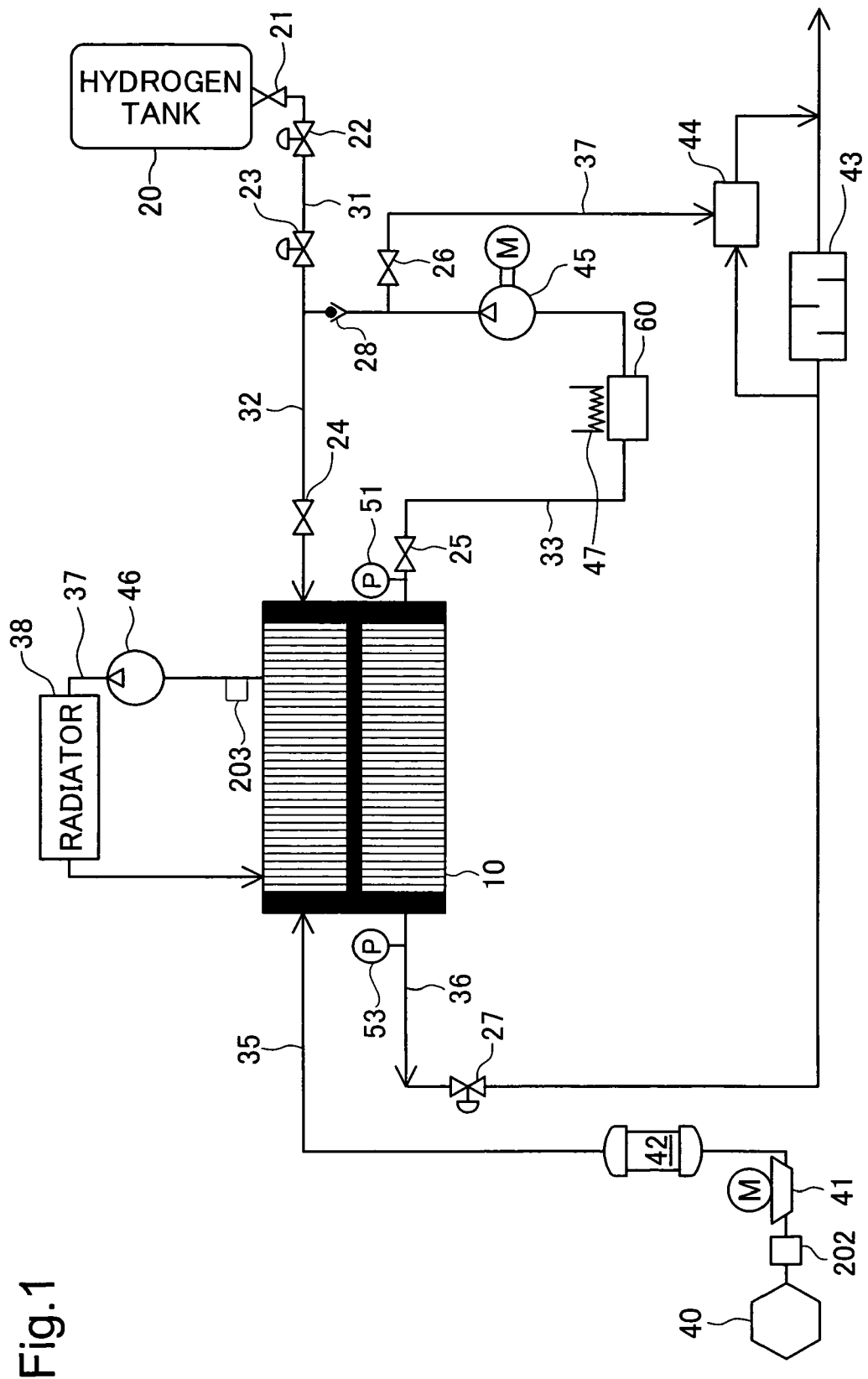
FIG. 1 is an explanatory diagram showing the overall constitution of the fuel cell system as an embodiment.

Following, embodiments of the present invention are described while referring to the drawings.

First Embodiment

Device Constitution

FIG. 1 is an explanatory drawing showing the overall constitution of the fuel cell system as an embodiment. The fuel cell system of the embodiment is incorporated as a power source in an electrical vehicle driven by a motor. Electricity generation is performed according to operation of the accelerator by the operator, and the vehicle can run using that power. The fuel cell system of the embodiment does not have to be located in the vehicle, but may also have various constitutions such as being a stationary fuel cell or the like.

A fuel cell stack 10 is a laminated body formed by layering a plurality of individual cells for generating electricity by an electrochemical reaction of hydrogen and oxygen. Each individual cell has a constitution for which a hydrogen pole (hereafter called an anode) and an oxygen pole (hereafter called a cathode) are arranged surrounding an electrolytic membrane. In this embodiment, a solid polymer type cell with a solid polymer membrane such as Nafion (registered trademark) is used as the electrolytic membrane, but the invention is not limited to this, and various types of cells can be used.

Compressed air is supplied as gas containing oxygen to the cathode of the fuel cell stack 10. The air is taken in from a filter 40, and after being compressed by a compressor 41, is humidified by a humidifier 42, and is supplied to the fuel cell stack 10 from a piping 35. A temperature sensor 202 that detects intake air temperature is provided at the piping 35. The exhaust from the cathode (hereafter called cathode off gas) is discharged to outside through a piping 36 and a muffler 43. The air supply pressure is detected by a pressure sensor 53 provided at the piping 36, and is controlled by the opening level of a pressure regulating valve 27.

Hydrogen is supplied via a piping 32 to the anode of the fuel cell stack 10 from a hydrogen tank 20, in which the high pressure hydrogen is stored. In place of the hydrogen tank 20, it is also possible to generate hydrogen or a gas containing hydrogen using a reforming reaction with alcohol, hydrocarbon, aldehyde and the like as raw materials, and the generated gas can be supplied to the anode.

The pressure and the amount supplied of the hydrogen stored at high pressure in the hydrogen tank 20 are adjusted by the shut valve 21, the regulator 22, the high pressure valve 23, and the low pressure valve 24 provided at the outlet, and the hydrogen is then supplied to the anode. The exhaust from the anode (hereafter called anode off gas) is flowed out to a piping 33. A pressure sensor 51 and a valve 25 are provided at the anode outlet, and these are used for control of the supply pressure and amount to the anode.

The piping 33 branches into two ways at the middle. One is connected to the discharge pipe 37 for discharging the anode off gas to the outside, and the other is connected to the piping 32 via a check valve 28. As a result of the hydrogen being consumed by the generation of electricity at the fuel cell stack 10, the pressure of the anode off gas is in a relatively low state, so a hydrogen pump 45 is provided at the piping 33 to pressurize the anode off gas.

While the discharge valve 26 provided on the discharge pipe 37 is closed, the anode off gas is inserted into the fuel cell stack 10 again via the piping 32. The hydrogen that was not consumed by generation of electricity remains in the anode off gas, so by having it circulate in this way, it is possible to effectively use hydrogen.

During the circulation of the anode off gas, the hydrogen is consumed by the electromotive reaction, but impurities other than hydrogen, for example nitrogen, which is transmitted from the cathode through the electrolytic membrane or the like, is not consumed and remains, so the concentration of impurities at the anode gradually increases. In this state, when the discharge valve 26 opens, the anode off gas goes through the discharge pipe 37, and after being diluted by the air at a diluter 44, the volume of circulation of the impurities discharged to the outside decreases. However, at this time, since hydrogen is also discharged simultaneously, the open volume of the discharge valve 26 is suppressed as much as possible, and this is desirable from the perspective of improving fuel consumption.

By cooling the anode off gas that passes through, the gas-liquid separator 60 separates the water contained in the anode off gas into steam (gas) and water (liquid), and of collecting the water. The collected water is used for humidification of hydrogen or oxygen supplied to the fuel cell, or the like. A heater, which performs thawing when the gas-liquid separator 60 freezes, is provided close to the gas-liquid separator 60. The heater 47 performs thawing using power for which electricity was generated by the fuel cell stack 10, heat generated by the electricity generation, or battery power.

In addition to hydrogen and oxygen, cooling water is also supplied to the fuel cell stack 10. The cooling water is flowed in the discharge pipe 37 for cooling by the pump 46, and is cooled at the radiator 38 and supplied to the fuel cell stack 10. A temperature sensor 203 that detects the temperature of the cooling water is provided at the outlet from the fuel cell stack 10.

Figure 2:
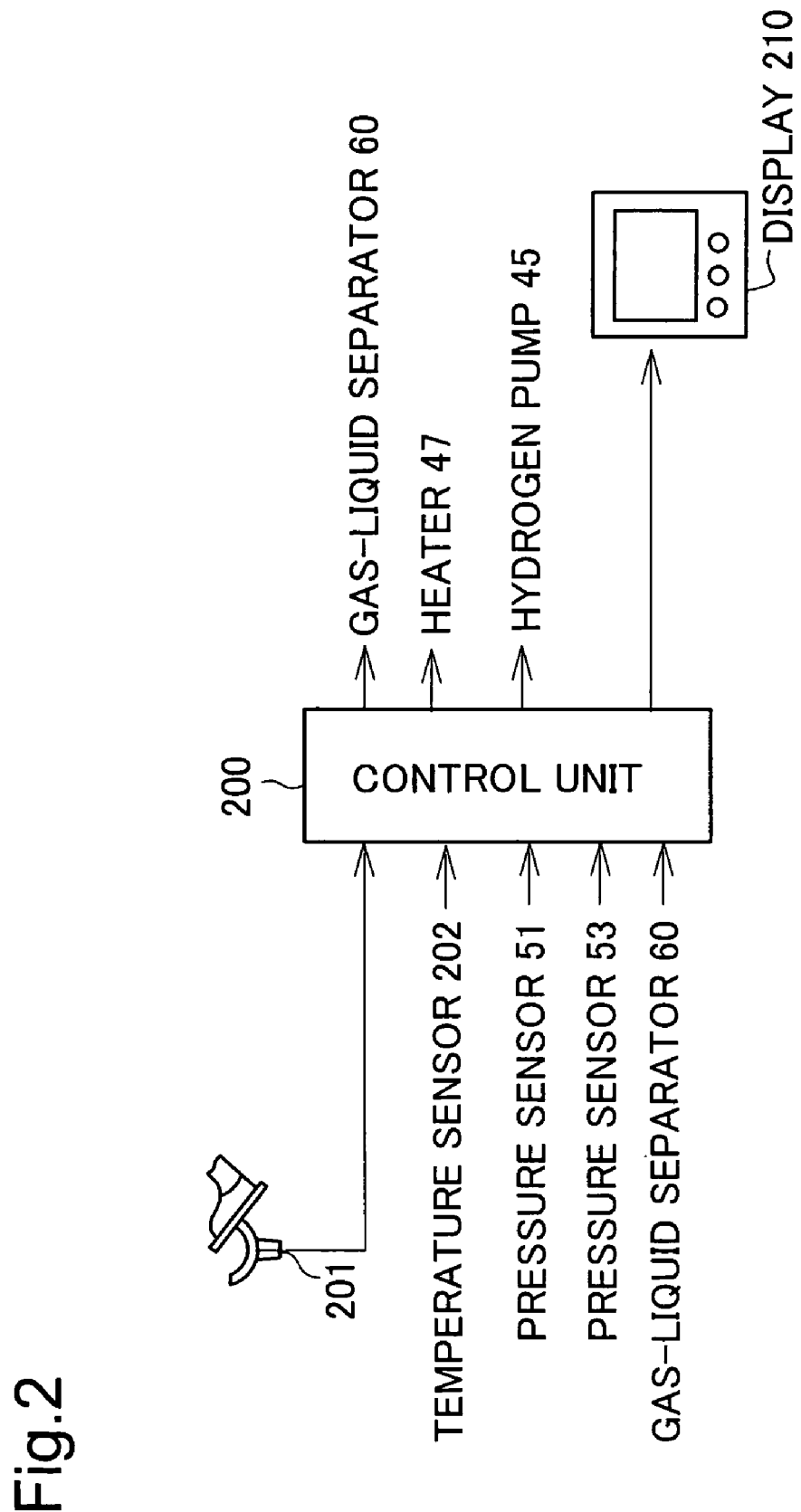
FIG. 2 is an explanatory diagram showing a control unit for controlling the operation of the fuel cell system.

Control Unit:

FIG. 2 is an explanatory drawing showing the control unit 200 for controlling the operation of the fuel cell system. The control unit 200 is constituted as a microcomputer comprising internally a CPU, RAM, and ROM, and the system operation is controlled according to a program stored in the ROM. The control unit 200 functions as a freezing judgment device. In FIG. 2, an example of the signal input and output to the control unit 200 for realizing this control is indicated by a solid line. As input, included, for example, are the detection signals from the temperature sensor 202, the pressure sensor 51, the pressure sensor 53, the gas-liquid separator 60, and the accelerator open level sensor 201. Generation of electricity is performed according to the operating volume of the accelerator detected by the accelerator open level sensor 201, and the vehicle can run by this power. As output, included, for example, are control signals to the gas-liquid separator 60, the hydrogen pump 45, the heater 47, and the display 210. Displayed in the display 210 is notification information to the user such as, when processing during freezing, prohibition of activation of the fuel cell system, or that thawing processing is underway.

Figure 3:
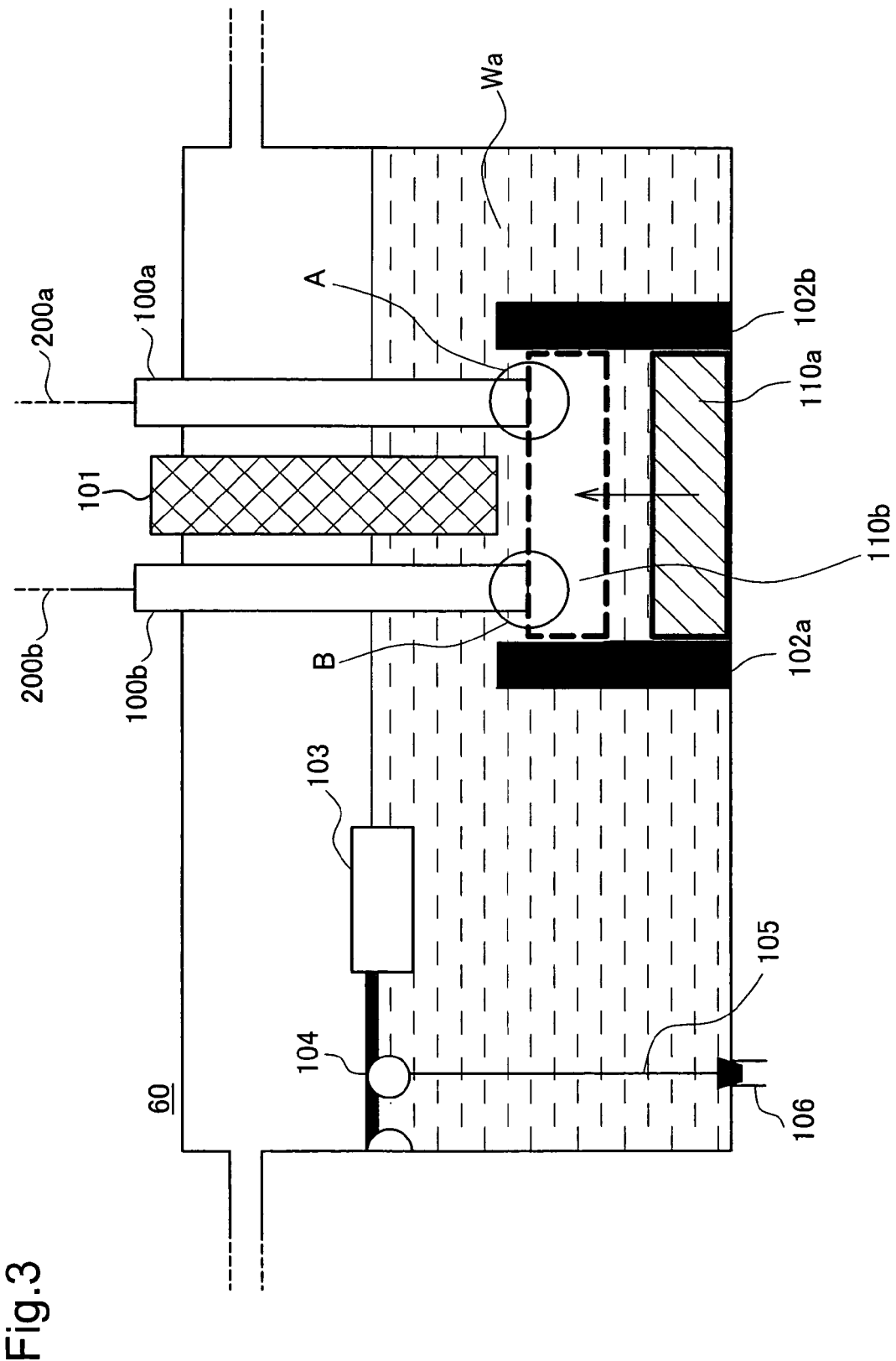
FIG. 3 is a cross section view for explaining the constitution of the gas-liquid separator of the first embodiment.

Gas-Liquid Separator Constitution:

FIG. 3 is a cross section view for explaining the constitution of the gas-liquid separator of the first embodiment. The gas-liquid separator 60 comprises a water discharge mechanism and a freezing judgment mechanism of the collected water Wa. As the water discharge mechanism, comprised are a float 103, a support 104 for supporting so as to be able to move the float 103, and a nozzle 105 extending from the support 104 for performing opening and closing of the water discharge port 106. When the water level of the water Wa reaches a specified value or higher, the float 103 rises, and this lifts up the support 104 and the nozzle 105 extending from the support 104. When the nozzle 105 is lifted up, the water discharge port 106 is opened, and the water that has accumulated to the specified value or higher is discharged to outside.

As the freezing judgment mechanism, comprised are electrodes 100a and 100b, an iron core 101 located between the electrodes 100a and 100b, a magnetic absorption substance 110a located in the water below the iron core 101, and guides 102a and 102b for regulating the operation of the magnetic absorption substance 110a. The electrodes 100a and 100b are connected to the control unit 200 by the connecting wires 200a and 200b, forming an electric circuit. Even if voltage is applied to the electrodes 100a and 100b, current does not flow to this circuit because contact points A and B at the end in water of the electrodes 100a and 100b are open. The electric circuit becomes a closed circuit by each contact point closing when conductive substances contact the contact points A and B, resulting in a conductive state, specifically, the flow of current. The control unit 200 detects this conductive state and performs freezing judgment.

The control unit 200, by applying voltage to the electrodes 100a and 100b, generates a magnetic field between the electrodes 100a and 100b, and the iron core 101 receives the effect of the magnetic field and changes to an electromagnet. Hereafter, the iron core 101 in this state will be called the electromagnet 101. When not frozen, after voltage is applied to the control unit 200, after a specified time has elapsed, the magnetic absorption substance 110a is pulled to the electromagnet 101, this floats together with the guides 102a and 102b, rises to the position of the magnetic absorption substance 110b indicated by the dotted line, and contacts the contact points A and B of the end in water of the electrodes 100a and 100b. By the magnetic absorption substance 110a contacting the contact points A and B, the electric circuit described above becomes a closed circuit, current flows, and the control unit 200 detects a conductive state. Specifically, if the control unit 200 is able to detect a conductive state, it judges that the water Wa within the gas-liquid separator is not frozen.

When frozen, even when the electromagnet 101 and the magnetic absorption substance 110a are pulled together, there is ice between the items, so it is difficult for the magnetic absorption substance 110a to float up. Because of this, after voltage is applied to the electrodes 100a and 100b, when a conductive state is not detected even after the specified time has elapsed, the control unit 200 judges that the water Wa within the gas-liquid separator 60 is frozen.

By using this kind of constitution, it becomes possible to judge using a simple constitution the freezing of a mechanical device, such as a gas-liquid separator or the like, for which judgment of freezing is difficult. Freezing can be judged not simply by the presence or absence of conductivity, it is also possible to consider the elapsed time up to detection of conductivity. By doing this, it is possible to detect a half frozen state. Hereafter, the freezing judgment process will be described.

Figure 4:
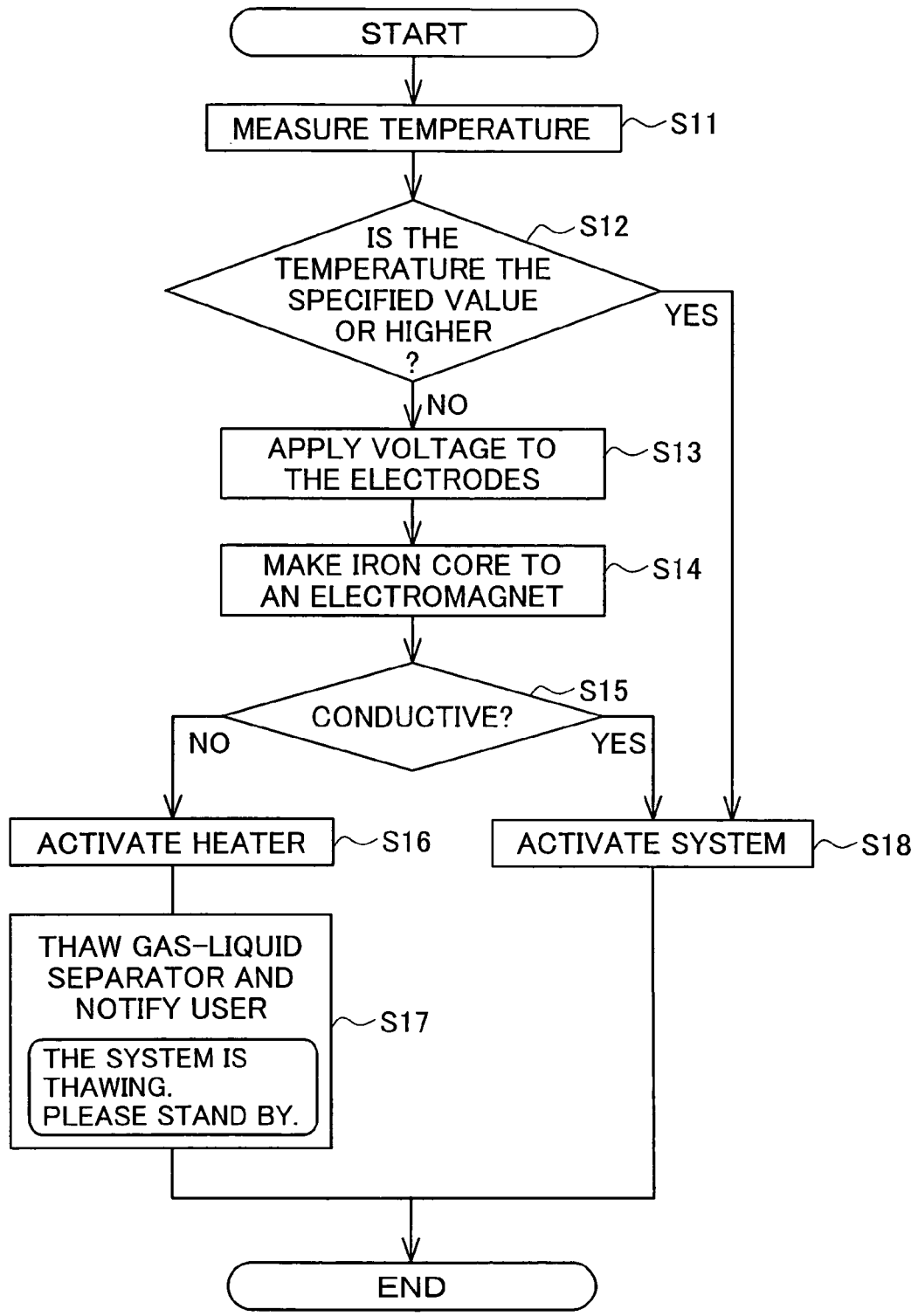
FIG. 4 is a flow chart for explaining the freezing judgment process of the first embodiment.

Freezing Judgment Process:

FIG. 4 is a flow chart for explaining the freezing judgment process. The freezing judgment process is a process for the control unit 200 executing control of each function block according to the activation operation of the fuel cell system performed by the operator. With the first embodiment, a judgment was made of whether or not the water collected within the gas-liquid separator 60 is frozen was done using the water flow characteristics. Note that flow characteristics means the behavior of fluid that changes according to the conditions at different times, whereby for example, water pooled in a container, when not frozen, flows according to the movement when the container is tilted, and when not frozen, changes to an ice state, so even when the container is tilted, does not flow within the container. Specifically, we can say that water has the characteristic of flowing when not frozen, and when frozen, has the characteristic of not flowing.

When this process starts, the control unit 200 reads the external temperature from the temperature sensor 202 (step S11). When the external temperature measured at the temperature sensor 202 is a specified value or higher (step S12), the gas-liquid separator 60 is judged to be not frozen, and normal system activation processing is performed (step S18). It is also possible to reference the history of the external temperature measured by the temperature sensor 202 to perform freezing judgment. The specified value is a temperature that is at least higher than the freezing point of water, and one for which freezing is possible.

When the external temperature is not the specified value or greater (step S12), it is judged that there is a high possibility that the water inside the gas-liquid separator 60 is frozen, and freezing judgment processing is performed. By applying a voltage to the electrodes 100a and 100b located within the gas-liquid separator 60 (step S13) and generating a magnetic field around the electrodes 100a and 100b, the control unit 200 changes the iron core 101 to the electromagnet 101 (step S14).

After voltage is applied to the electrodes 100a and 100b, and after the specified time has elapsed, the control unit 200 judges whether or not conductivity has been detected (step S15). If conductivity can be detected, the water within the gas-liquid separator 60 is judged to be not frozen, and the system is activated (step S18). When the control unit 200 cannot detect conductivity, the water within the gas-liquid separator 60 is judged to be frozen, the heater is activated (step S16), and thawing of the ice within the gas-liquid separator 60 is performed. The thawing process may also be done by supplying power from the battery and activating the heater 47, for example. As shown in the figure, the control unit 200 notifies the user that the thawing process is in progress via the display 210 (step S17).

With the fuel cell system of the first embodiment described above, using a simple constitution, it is possible to judge the freezing of the water inside the gas-liquid separator, and to control the activation of the system based on the results of this freezing judgment, so it is possible to prevent beforehand it not being possible to supply gas to the fuel cell satisfactorily, making it possible to avoid degradation of the system.

Figure 5:
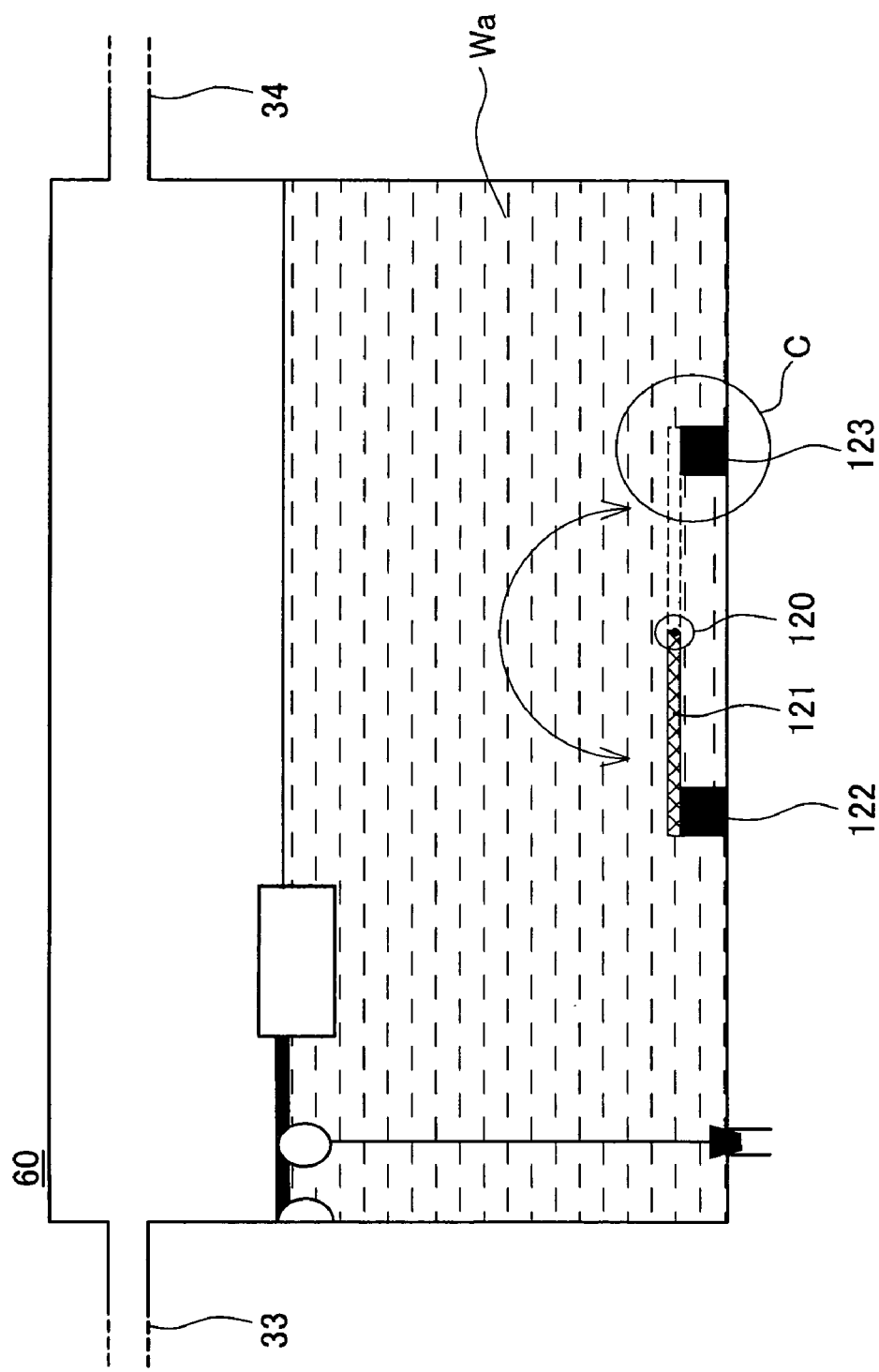
FIG. 5 is a cross section view for explaining the constitution of the gas-liquid separator of the second embodiment.

Variations:

With the first embodiment described above, a magnetic field was generated between two electrodes, the iron core provided between these was used as an electromagnet, and freezing was judged by the state of whether the magnetic absorption substance was able to move within the water, but it is also possible to perform freezing judgment using the constitution shown in FIG. 5.

FIG. 5 is a cross section view for explaining the constitution of the gas-liquid separator of a variation example of the first embodiment. The gas-liquid separator 60 of this variation example comprises a rod member 121 that is able to move within the water, a support 122 for supporting the rod member 121 at a specified position, a support point 120 for rotating the rod member 121 as shown by the arrow in the figure, and a contact point 123 for the rod member 121 to contact when rotated following the arrow.

The contact point 123 has a sensor located in contact with the control unit 200, and when the rod member 121 makes contact, a signal is notified to the control unit 200. By rotating the support point 120 using a motor, for example, the control unit 200 rotates the rod member 121 following the arrow. When not frozen, the rod member 121 contacts the contact point 123 as shown by the dotted line (indicated by circle C in the figure). At this time, the control unit 200 has received signals from the sensor, and judges the state to be not frozen.

When frozen, the rod member 121 cannot operate, so when the control unit 200 rotates the support point 120 using a motor and is not notified by signals from the sensor after a specified time has elapsed, it is also possible to judge this as being in a frozen state. It is also possible to judge as being in a frozen state by detecting that the support point 120 does not rotate.

In addition to this, as a freezing Judgment method using the flow characteristics of water, it is possible to judge by water flow when the gas-liquid separator 60 is tilted or oscillated, or to judge based on the oscillation frequency when oscillated.

Second Embodiment

With the first embodiment, the freezing of the water within the gas-liquid separator 60A was judged by the operating state of the movable member located within the gas-liquid separator. With the second embodiment, the freezing of the water within the gas-liquid separator 60A is judged based on the pressure value of the hydrogen gas measured by the pressure sensor located in the piping branched from the anode off gas piping for which bypass piping is located so as to flow into the water of the gas-liquid separator.

Figure 6:
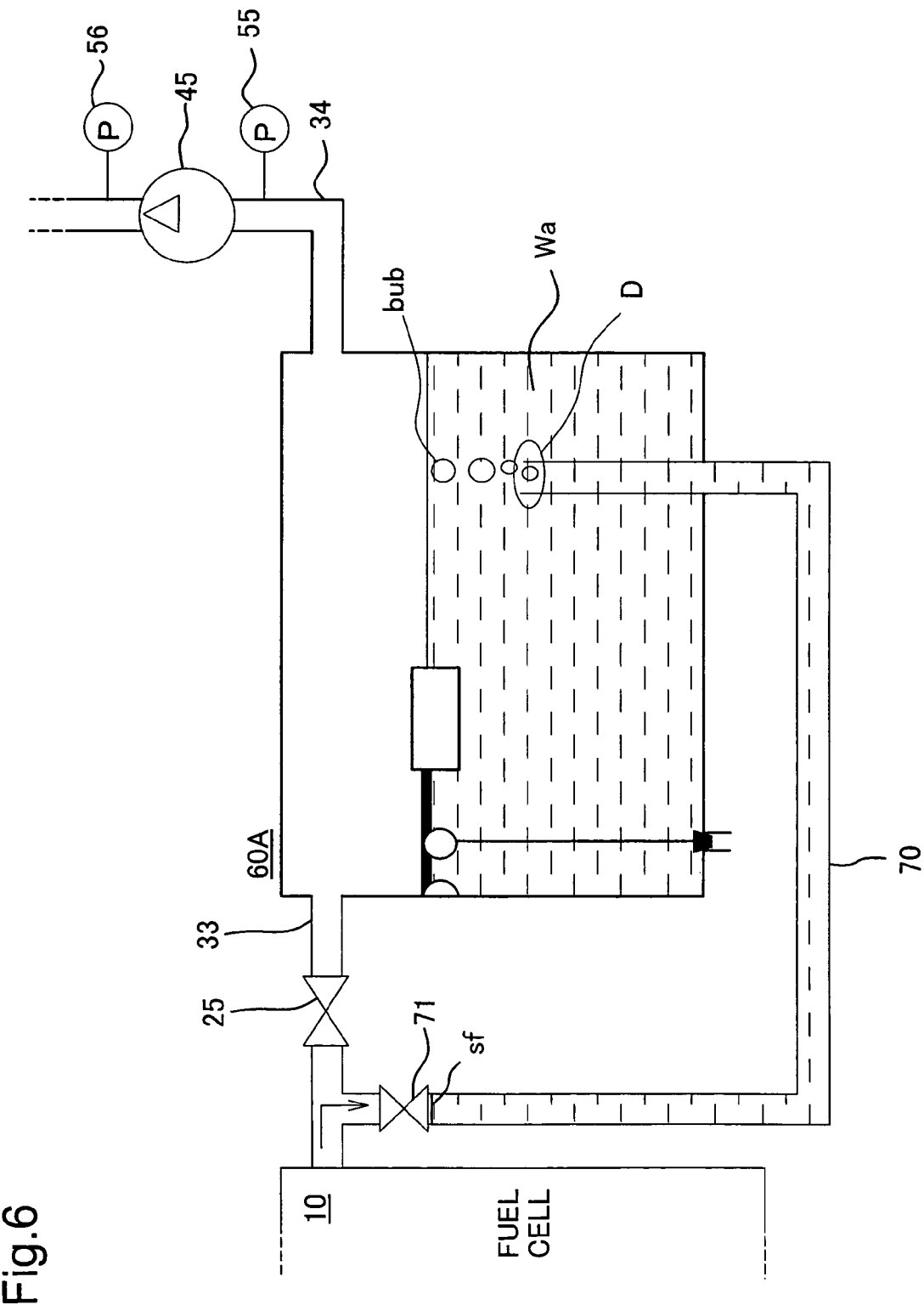
FIG. 6 is a cross section view for explaining the constitution of the gas-liquid separator of the second embodiment.

Gas-Liquid Separator Constitution:

FIG. 6 is a cross section view for explaining the constitution of the gas-liquid separator of the second embodiment. The anode off gas discharged from the fuel cell stack 10 is flowed out to the piping 33. A valve 25 for regulating the outflow volume of the anode off gas is located in the piping 33. As shown in the figure, the bypass piping 70 is branched from the piping 33 and located so that the anode off gas flows, and the gas-liquid separator end of the bypass piping 70 is located under the water surface of the gas-liquid separator 60A. The valve 71 for adjusting the outflow volume of the anode off gas is located in the bypass piping 70, and when the control unit 200 does the freezing judgment of the water of the gas-liquid separator 60A, it controls the opening and closing of the valve 25 and the valve 71, and switches so that the anode off gas flows out to one or the other of the piping 33 or the bypass piping 70. Instead of the valve 25 or 71, it is also possible to provide a switching valve at the branching location.

The anode off gas that passes through the gas-liquid separator 60A flows into the piping 34. Located in the piping 34 are the hydrogen pump 45 for pressurizing the anode off gas, the pressure sensor 55 that measures the upstream side pressure of the hydrogen pump 45, and the pressure sensor 56 that measures the downstream side pressure. The control unit 200 judges the freezing based on the measurement value of the pressure sensors 55 and 56.

When judging the freezing of the water Wa in the gas-liquid separator 60A of this embodiment, because it is before the activation of the system, the valve 25 is closed beforehand. The control unit 200 opens the valve 71, and controls so that the anode off gas that flows out from the fuel cell stack 10 flows to the bypass piping 70. Because the gas-liquid separator 60A end of the bypass piping 70 is located in water, the water also flows into the bypass piping 70, and the water surface sf is at the same position as the water surface of the gas-liquid separator 60A.

When not frozen, the anode off gas passes through the water within the bypass piping 70, is released from within the water as air bubbles bub from the outlet of the bypass piping 70 indicated by the circle D in the figure, and flows into the piping 34. The anode off gas is pressurized by the hydrogen pump 45, and flows in the piping. In this case, the pressure values measured at the pressure sensors 55 and 56 are no different from during normal activation of the fuel cell system.

When frozen, the hydrogen pump 45 operates with the anode off gas that flows into the bypass piping 70 remaining unreleased from within the water of the gas-liquid separator 60A, so the pressure value measured by the pressure sensor 55 is lower than during normal activation of the fuel cell system. The control unit 200 judges that the water within the gas-liquid separator 60A is frozen when the difference between this pressure value and the pressure value measured by the pressure sensor 55 during normal operation is a specified value or greater.

Figure 7:
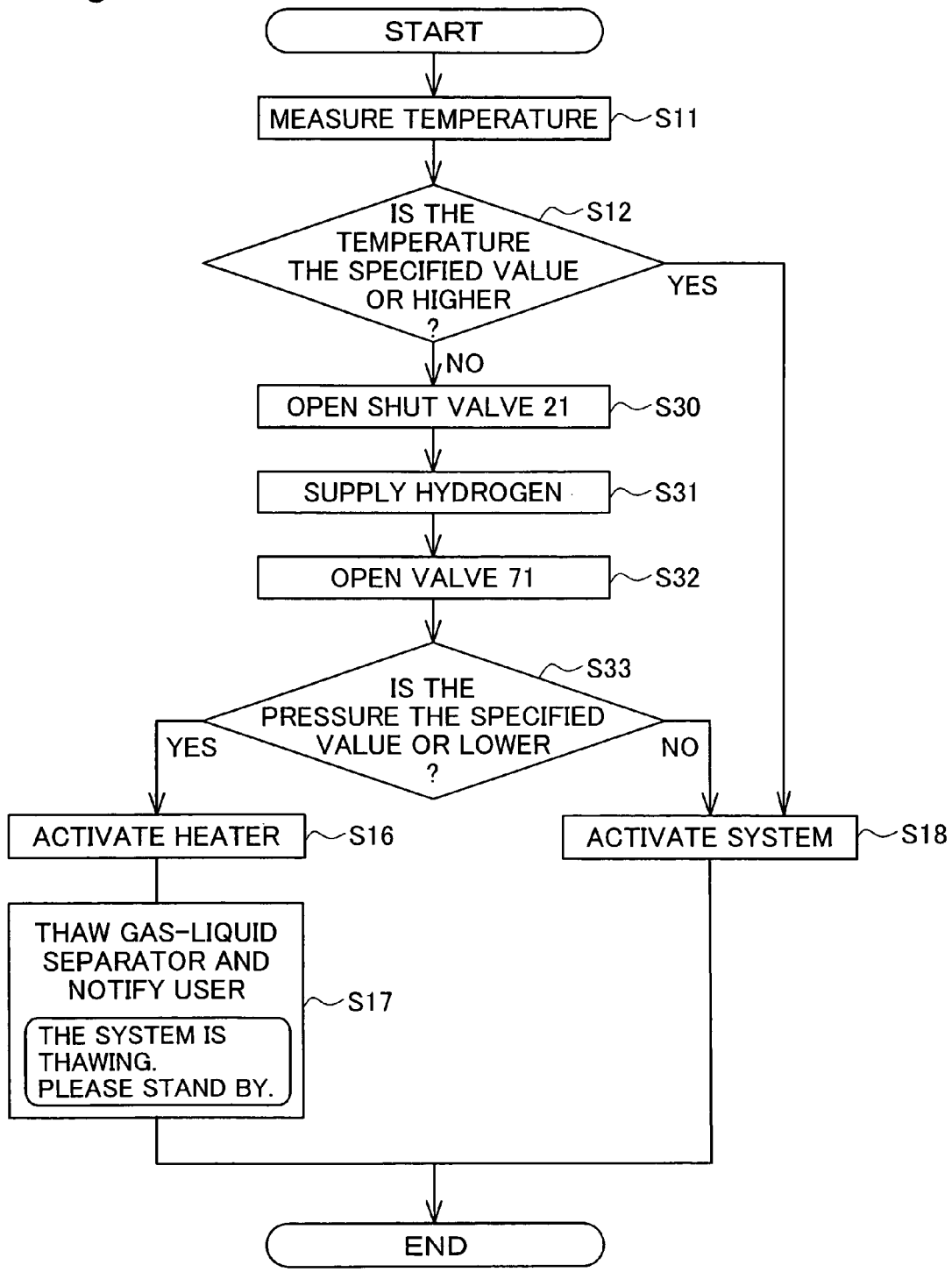
FIG. 7 is a flow chart for explaining the freezing judgment process of the second embodiment.

Freezing Judgment Process:

FIG. 7 is a flow chart for explaining the freezing judgment process of the second embodiment. This process is a process for the control unit 200 to execute control of each function block. Step S11 to step S12, and step S16 to S18 are the same as those of the first embodiment, so description of these is omitted.

The control unit 200 performs the freezing judgment process when the external temperature is not a specified value or more (step S12). First, the shut valve 21 is opened (step S30), and the hydrogen gas is supplied from the hydrogen tank 20 to the fuel cell stack 10 (step S31). Next, to have the anode off gas discharged from the fuel cell stack 10 flow into the bypass piping 70 side, the valve 71 is opened (step S32). With this embodiment, the freezing judgment is before the system activation, and the valve 25 located in the piping 33 is closed beforehand.

After the specified time has elapsed, the control unit 200 judges whether or not the pressure value measured by the pressure sensor 55 is a specified value or less (step S33). When the pressure value is the specified value or less, the water within the gas-liquid separator 60A is judged to be freezing, and processing when frozen of step S16 to step S17 is performed. When the pressure value is not the specified value or less, it is judged to be not frozen, and the system is activated (step 18).

With the fuel cell system of the second embodiment described above, the same as with the first embodiment, it is possible to easily detect freezing of mechanical equipment for which detection of freezing is difficult such as a gas-liquid separator or the like, and when frozen, activation of the system is prohibited, so it is possible to avoid the harmful effects during starting of the fuel cell system, while at the same time preventing degradation to the fuel cell system. Also, when frozen, the heater is activated to perform thawing, so when thawing is detected, it is possible to quickly activate the fuel cell system.

Variations:

With the second embodiment described above, the hydrogen gas was supplied from the hydrogen tank 20, but it is also possible to use the residual hydrogen during the previous operation of the fuel cell system.

Figure 8:
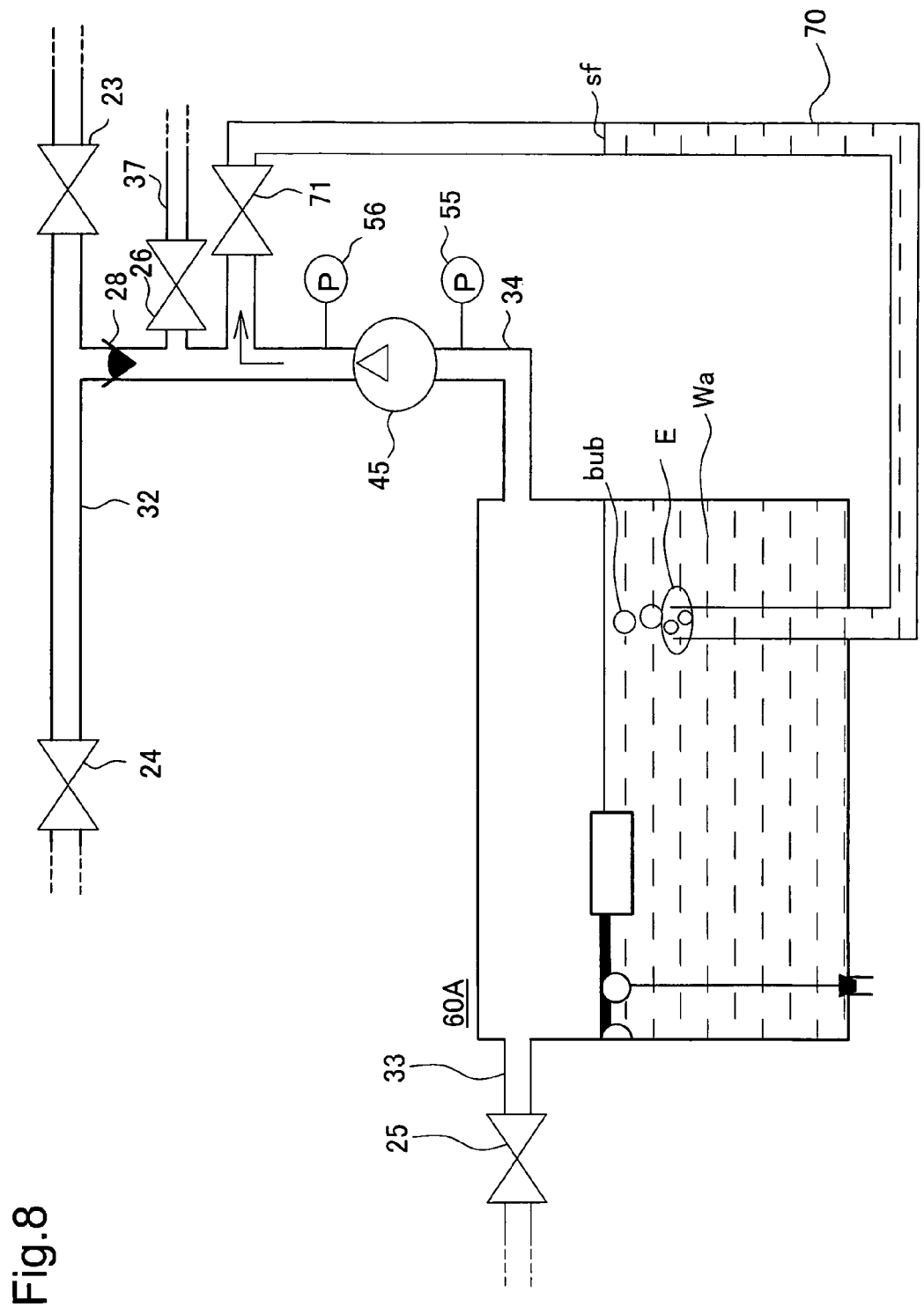
FIG. 8 is a cross section view for explaining the constitution of the gas-liquid separator of a variation example of the second embodiment.

FIG. 8 is a cross section view for describing the constitution of the gas-liquid separator for a variation example of the second embodiment. As shown in the figure, the bypass piping 70 branches from the downstream side of the hydrogen pump 45, the other end of the bypass piping 70 is located to be below the water surface of the as liquid separator 60, and the valve 71 for adjusting the inflow of the anode off gas is located on the bypass piping 70. The same as with the second embodiment, the water surface sf is at the same position as the water surface of the gas-liquid separator 60.

When performing freezing judgment, the control unit 200 opens the valve 81, and activates the hydrogen pump 45. The hydrogen pump 45 pressurizes the remaining hydrogen remaining in the piping 33, 34, and the gas-liquid separator 60A during the previous operation of the fuel cell system, and flow this to the bypass piping 70. When performing the freezing judgment during activation, each of the various valves are closed beforehand.

When not frozen, the anode off gas goes through the bypass piping 70, this is released from within the water as the air bubbles bub from the outlet of the bypass piping 70 indicated by the circle E in the figure, and flows into the piping 34. The various types of valves other than the valve 71 are closed, so the anode off gas circulates in a closed path of the piping 34 to the bypass piping 70 to the gas-liquid separator 60A, so during the freezing judgment, the pressure values measured by the pressure sensors 55 and 56 are values within the specified range.

When frozen, the anode off gas that flows into the bypass piping 70 is left as is without being released from within the water of the gas-liquid separator 60A, and the hydrogen pump 45 operates, so the pressure value measured by the pressure sensor 55 is lower than the specified value or above. The control unit 200 judges the water within the gas-liquid separator 60A to be frozen when the pressure value measured by the pressure sensor 55 is lower than the specified or more.

By using this kind of constitution, using the remaining hydrogen of the previous operation of the fuel system without waiting until supply of new hydrogen gas, it is possible to perform freezing judgment using a simple constitution, which is desirable.

Third Embodiment

With the first embodiment, freezing is judged based on the operating state of the movable member provided within the gas-liquid separator 60B. With the second embodiment, the bypass piping is provided in the water of the gas-liquid separator 60B from the piping, and freezing is judged by the pressure value measured by the pressure sensor. With the third embodiment, with a process that changes water to ice by freezing it, based on the fact that the volume expands, freezing is judged based on the difference in the volume of the water when frozen and when not frozen.

Figure 9:
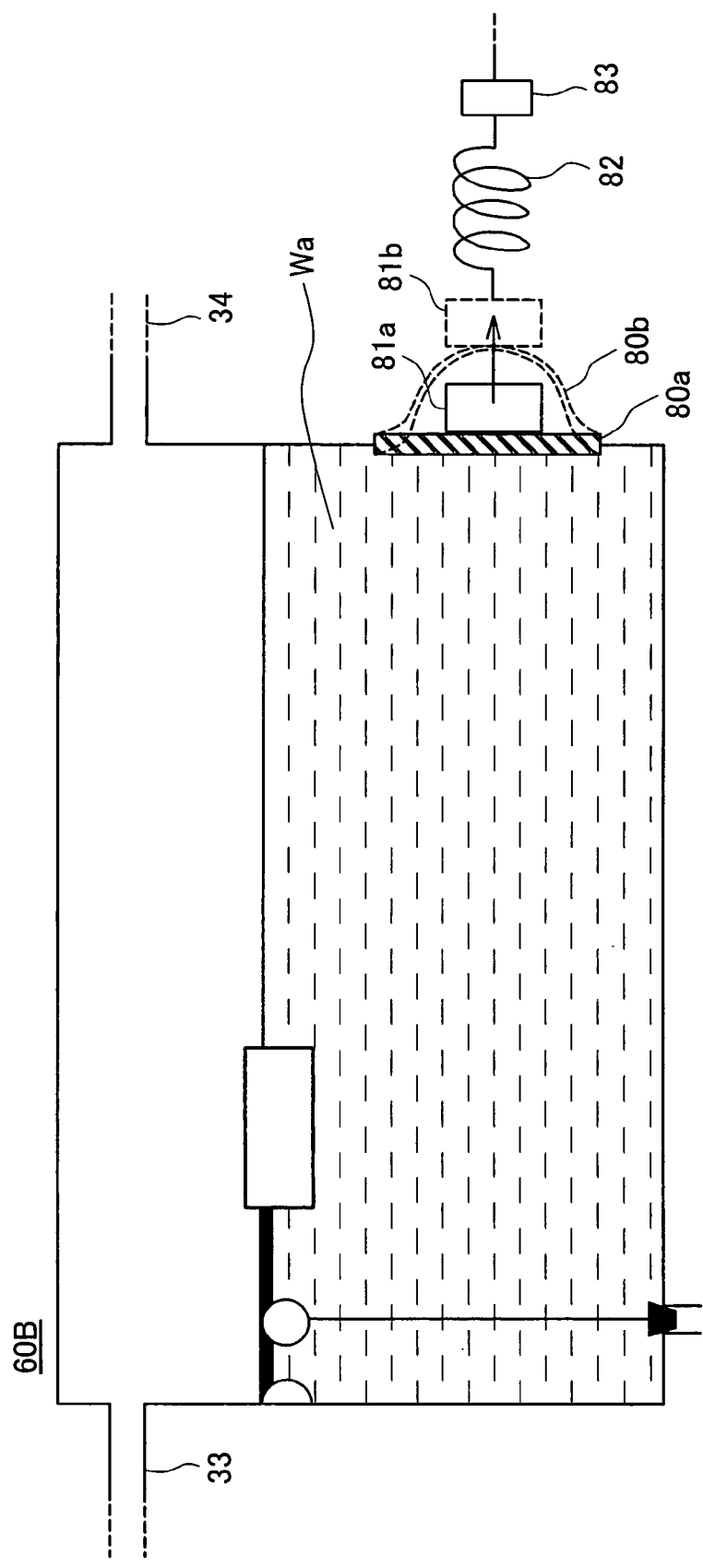
FIG. 9 is a cross section view for explaining the constitution of the gas-liquid separator of the third embodiment.

Gas-Liquid Separator Constitution:

FIG. 9 is a cross section view for explaining the constitution of the gas-liquid separator 60B of the third embodiment. A rubber thin film 80a is located on the side surface of the gas-liquid separator 60A, and the movable member 81a supported on a spring 82 is placed so as to be in contact with the thin film 80a. The other end of the spring 82 is provided with a fixed pressure sensor 83. Along with the expansion of the volume when the water Wa freezes, the thin film 80a expands to the outside of the gas-liquid separator 60B as shown by the thin film 80b of the dotted line. The movable member 81a is pressed as shown by the arrow by the thin film 80b, and while the spring 82 is pressed along with this, it moves to the position of the movable member 81b shown by the dotted line.

The pressure sensor 83 measures the pressure at the spring 82, and based on the measured pressure value and on the pressure value measured when the previous operation of the fuel cell system ended, judging is performed on the freezing of the water Wa of the gas-liquid separator 60B. Specifically, when not frozen, during freezing judgment of the fuel cell system, a difference of a specified value or more does not appear between the pressure value measured at the pressure sensor 83 and the pressure value measured at the end of the previous operation of the fuel cell system. In comparison to this, when frozen, the thin film 80a expands as shown by the thin film 80b shown in the figure, and at the movable member 81a, similarly, it moves to the position of the movable member 81b. Because of this, force is added in the arrow direction on the spring 83, and compared to the pressure value measured at the end of the previous operation of the fuel cell system, the pressure value measured at the pressure sensor 83 is greater than the specified value or higher. In this way, when the pressure value measured by the pressure sensor 83 is greater than the specified value or higher compared to the pressure value measured at the end of the previous operation of the fuel cell system, the control unit 200 judges the state to be freezing.

For the freezing judgment process, in the flow chart of FIG. 7 for describing the second embodiment, step 30 can be described as "pressure measurement," step 31 as "reading of pressure values during the end of the previous operation," step 32 as "comparison of pressure values," and step 33 as "is there a difference of a specified value or more in the pressure values?"

With the third embodiment described above, it is possible to perform the freezing judgment based on the difference in volume of the water when frozen and when not frozen, so it is possible to judge freezing of the gas-liquid separator using a simple constitution. Therefore, it is possible to prevent not being able to satisfactorily supply the off gas to the fuel cell stack, and to suppress degradation of the fuel cell system.

Variations:

With the third embodiment described above, freezing was judged based on the expanding of the thin film located under the water surface of the gas-liquid separator, but instead of the thin film, it is also possible to provide a pressure sensor under the water surface.

Figure 10:
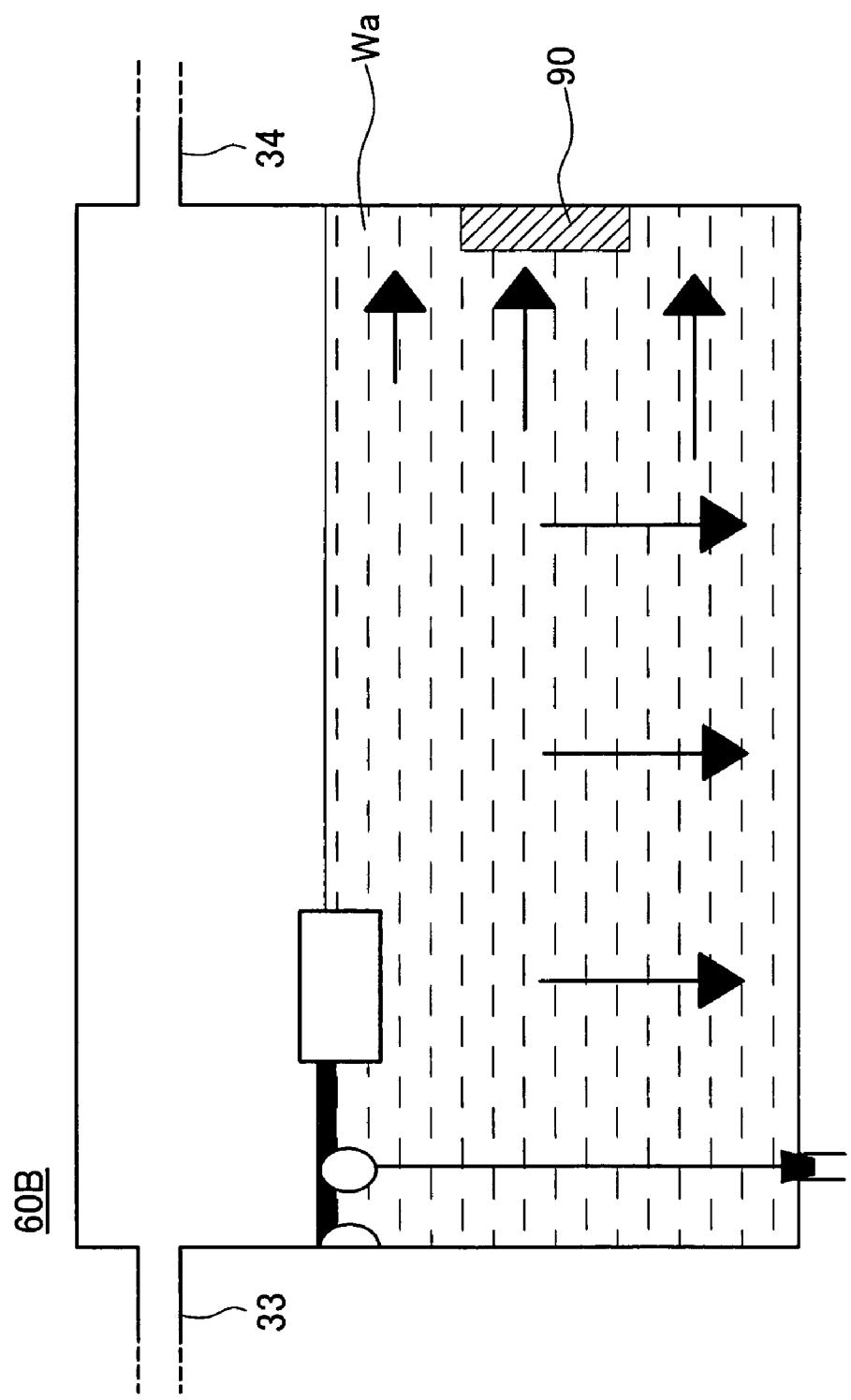
FIG. 10 is a cross section view for explaining the constitution of the gas-liquid separator of a variation example of the third embodiment.

FIG. 10 is a cross section view for explaining the constitution of the gas-liquid separator of a variation example of the third embodiment. The gas-liquid separator 60B comprises the pressure sensor 90 under the water surface. Water pressure is applied as shown by the arrow by the water Wa under the water surface of the gas-liquid separator 60B, and the control unit 200 judges freezing based on the water pressure measured by the pressure sensor 90.

When not frozen, a difference of a specified value or higher is does not appear between the pressure value measured by the pressure sensor 90 and the pressure value measured at the end of the previous operation of the fuel cell system. When frozen, the volume expands with the process of changing state from water to ice, so the pressure value measured at the pressure sensor 90 is higher than the pressure value measured at the end of the previous operation of the fuel cell system.

By using this kind of constitution, it is possible to judge the expansion of the volume of water within the gas-liquid separator, in other words, freezing, using a simple constitution, which is desirable.

With the third embodiment and the variation example described above, freezing was judged based on the pressure value measured during the freezing judgment performed before activation of the fuel cell system and on the pressure value measured at the end of the previous operation of the fuel cell system, but it is also possible to judge freezing when the pressure value is the specified value or greater, regardless of the pressure value measured at the end of the previous operation.

With the third embodiment, the movable member was used, but instead of the movable member, it is also possible to provide a switch. By doing this, it is possible to judge freezing based on the switch being on or off according to the thin film expansion, and to realize freezing judgment with a simple constitution.

Also, with the third embodiment, rubber was used for the thin film, but the invention is not limited to this, and the present invention can be realized as long as it is an elastic member that changes shape at a specified pressure value or higher. Note that the "specified pressure value" may be a value within a specified range from the pressure value detected when the water within the gas-liquid separator 60B is frozen, or may also be a value calculated from the volume expansion rate. Also, the freezing judgment may be done by, for example, providing the movable member to be in contact with the elastic member on the outside of the gas-liquid separator, having the elastic member expand to the outside along with the volume expansion due to the water within the gas-liquid separator freezing, and by detecting the operation state of the movable member due to that expansion.

Furthermore, as the method of judging freezing, other than the methods described above, it is also possible to use various methods such as propagation or reflection of the sound or reflection, transmission, or refraction of the light within the gas-liquid separator.

When freezing is detected in the gas-liquid separator for the fuel cell system of the present invention, the activation of the system was prohibited, but after that, when the thawing of the frozen locations is detected, if the system is quickly activated, it is possible to prevent activation delays.

Above, various embodiments of the present invention are described, but the present invention is not limited to these embodiments, and it is clear that various constitutions can be used in a range that does not stray from the gist of the invention.

The invention claimed is:

1. A fuel cell system comprising:
a fuel cell;
a gas supply pipe that supplies gas used for generating electricity to the fuel cell;
a gas discharge pipe that discharges gas discharged from the fuel cell,
a gas-liquid separator located in at least part of the gas discharge pipe and the gas supply pipe, for collecting water in the discharged gas; and
a freezing judgment device that performs a freezing judgment of the water collected within the gas-liquid separator based on differences in volume of the water collected within the gas-liquid separator when frozen and when not frozen,
wherein a detecting section of the freezing judgment device is provided in the gas-liquid separator
the freezing judgment device comprises an elastic member that changes shape with pressure and is provided at any part under the water surface within the gas-liquid separator,
wherein the freezing judgment device performs the freezing judgment based on a shape change state of the elastic member
and wherein the freezing judgment is performed during activation of the fuel cell system, and the fuel cell system comprises a system activation prohibition module that prohibits activation of the fuel cell system when freezing of the water is detected.

2. A fuel cell system recited in claim 1, wherein
the gas supply pipe includes a fuel gas supply pipe for supplying fuel gas to the fuel cell,
the gas discharge pipe includes an anode off gas discharge pipe for discharging the anode off gas from the fuel cell,
the gas-liquid separator is located above the anode off gas discharge pipe,
the fuel cell system further comprising:
linked bypass piping that branches from the anode off gas discharge pipe and which is continuous under the water surface within the gas-liquid separator;
a switching device that switches the fuel gas path to either the anode off gas discharge pipe or the linked bypass piping; and
a pressure measuring device that measures the pressure of the anode off gas discharge pipe, wherein
the freezing judgment device judges freezing based on the pressure value measured by the pressure measuring device in a state with the path switched to the linked bypass piping side.

3. A fuel cell system recited in claim 1, wherein
the freezing judgment device judges the freezing of the water collected within the gas-liquid separator based on a difference in a volume of the water within the gas-liquid separator when frozen and when not frozen.

4. A fuel cell system recited in claim 3, further comprising a pressure measuring device that measures pressure at a part lower than a water surface within the gas-liquid separator,
wherein the freezing judgment device judges the freezing of the water collected within the gas-liquid separator based on the pressure measured.

5. A fuel cell system recited in claim 3, further comprising an elastic member that changes shape with pressure and is provided at any part under a water surface within the gas-liquid separator,
wherein the freezing judgment device judges freezing based on the shape change state of the elastic member.

6. A fuel cell system recited in claim 5, wherein
the gas-liquid separator has a side surface and a bottom surface, and
the elastic member is located near the bottom surface at the side surface within the gas-liquid separator.

7. A fuel cell system recited in claim 1, further comprising a pressure measuring device that measures a pressure at a part lower than a water surface within the gas-liquid separator.

8. A fuel cell system recited in claim 1, wherein
the gas-liquid separator has a side surface and a bottom surface, and
the elastic member is located near a bottom surface at a side surface within the gas-liquid separator.

* * * * *